(12) United States Patent
Jain et al.

(10) Patent No.: US 9,656,900 B2
(45) Date of Patent: May 23, 2017

(54) METHODS TO FABRICATE NANO-MACRO POROUS GLASS USING A WATER SOLUBLE PORE FORMER

(75) Inventors: Himanshu Jain, Bethlehem, PA (US); Hassan Mohamady Mohamed Moawad, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 385 days.

(21) Appl. No.: 13/358,858

(22) Filed: Jan. 26, 2012

(65) Prior Publication Data

US 2012/0189844 A1 Jul. 26, 2012

Related U.S. Application Data

(60) Provisional application No. 61/436,446, filed on Jan. 26, 2011.

(51) Int. Cl.
| | |
|---|---|
| *C03B 32/02* | (2006.01) |
| *C03C 11/00* | (2006.01) |
| *C03B 19/12* | (2006.01) |
| *C03B 19/06* | (2006.01) |

(52) U.S. Cl.
CPC ............. *C03B 32/02* (2013.01); *C03B 19/06* (2013.01); *C03C 11/005* (2013.01); *Y10T 428/268* (2015.01)

(58) Field of Classification Search
CPC ..... C03C 11/00; C03C 11/005; C03C 14/004; C03C 2204/02; C03B 19/01; C03B 19/06; C03B 19/063; C03B 19/066; C03B 19/08; C03B 19/09

USPC .................................. 65/17.3, 17.6, 21.4, 22
See application file for complete search history.

(56) References Cited

U.S. PATENT DOCUMENTS

| | | |
|---|---|---|
| 3,650,721 A | 3/1972 | Hammel |
| 3,758,284 A | 9/1973 | Haller |
| 4,395,271 A | 7/1983 | Beall |
| 5,043,369 A | 8/1991 | Bahn |
| 6,511,511 B1 | 1/2003 | Slivka |
| 6,993,406 B1 | 1/2006 | Cesarano, III et al. |
| 8,389,018 B2 | 3/2013 | Jain et al. |
| 2005/0263918 A1* | 12/2005 | Heidenreich et al. .......... 264/41 |
| 2007/0203584 A1 | 8/2007 | Bandyopadhyay et al. |
| 2008/0034801 A1 | 2/2008 | Canham |

(Continued)

FOREIGN PATENT DOCUMENTS

WO WO 2008101011 A1 * 8/2008

OTHER PUBLICATIONS

Marlene De Barros Coelho et al.; "Sol-Gel Synthesis of Bioactive Glass Scaffolds for Tissue Engineering: Effect of Surfactant Type and Concentration"; Journal of Biomedical Materials Research Part B: Applied Biomaterials. 2005, vol. 75, Issue 2, pp. 451-456.

(Continued)

*Primary Examiner* — Jodi C Franklin
(74) *Attorney, Agent, or Firm* — Saul Ewing LLP (57) ABSTRACT

Provided herein are methods for preparing nano-macroporous glass articles, such as bioscaffolds, from starting materials such as phosphosilicate glasses made by melt-quench methods, mixed with a soluble pore former such as a sugar, followed by steps of dissolving, heating, and leaching to yield a glass composition having a highly interconnected system of both macropores and large scale nanoporosity.

23 Claims, 7 Drawing Sheets

(56) References Cited

U.S. PATENT DOCUMENTS

2008/0038534 A1* 2/2008 Zenati et al. .............. 428/312.6
2008/0060382 A1 3/2008 Rake
2010/0015244 A1 1/2010 Jain

OTHER PUBLICATIONS

Xiaoxia Yan et al.; "The In-vitro Bioactivity of Mesoporous Bioactive Glasses"; Biomaterials. 2006, vol. 27, Issue 18, Jun. 2006, pp. 3396-3402.
Korean Intellectual Property Office; "International Search Report and the Written Opinion of the International Searching Authority" prepared for PCT/US2008/053851, mailed on Jun. 25, 2008.
Clupper et al., "In vitro bioactivity of S520 glass fibers and initial assessment of osteoblast attachment," J Biomed Mater Res A., Jan. 2003; 6(7): 285-94.
Clupper et al. "Bioactive evaluation of 45S5 bioactive glass fibres . . . " Journal of Materials Science: Materials in Medicine, vol. 15, 2004, pp. 803-808.
Elmer, T.; Porous and Reconstructed Glasses, ASM International, vol. 4, 1992, pp. 427-432.
C.C. Lin et al., "$Na_2CaSiO_2O_6$—$P_2O_5$ Based Bioactive Glasses. Part 1: Elasticity and Structure," J. Non-Cryst. Solids 351, 3195-203 (2005).
J.M. Oliveria, et al., "Effect of $SiO_2$ on amorphous phase separation of $CaO$—$P_2O_5$—$SiO_2$—$MgO$ glasses", J. Non-Cryst. Solids 273 (2000) 59-63.
Jing Yi, et al. "Sol-gel derived mesoporous bioactive glass fibers as tissue-engineering scaffolds" J. Sol-Gel Sci Technol 45 (2008) 115-119.
L.L. Hench, et al., "Bonding mechanisms at the interface of ceramic prosthetic materials," J. Biomed. Mater. Res. 5 [6] (1971) 117-141.
Wei Xia, et al. "Fabrication and in vitro biomineralization of bioactive glass (BG) nanofibers" Nanotechnology 18 (2007) 135601-135607.

* cited by examiner

METHODS TO FABRICATE NANO-MACRO POROUS GLASS USING A WATER SOLUBLE PORE FORMER

CROSS REFERENCE TO RELATED APPLICATIONS

This application claims the benefit of U.S. Provisional Application No. 61/436,446 filed on Jan. 26, 2011, and U.S. Provisional Application No. 61/298,284 filed on Jan. 26, 2010, and incorporates those patent applications herein by reference as though textually fully set forth herein.

STATEMENT REGARDING FEDERALLY SPONSORED RESEARCH OR DEVELOPMENT

This subject matter is related to work conducted at least in part with financial support from the United States National Science Foundation International Materials Institute for New Functionality in Glass (DMR-0844014) and Materials World Network (DMR-0602975) programs. The government of the United States may have certain rights herein.

BACKGROUND OF THE INVENTION

Several approaches have been proposed during the last decade for restoring bones damaged from injuries or diseases. It is well-known that there are many difficulties associated with the use of autografts, allografts, and xenografts due to donor site scarcity, rejection, disease transmission, multiple operations, high costs, and other problems. Therefore, recently researchers have been focusing on the development of new possibilities that would overcome these drawbacks, including through tissue engineering. Synthesis or regeneration of tissues and organs with the help of porous scaffolds, which mimic the body's own extracellular matrix, is being pursued. The acceptable scaffolds should exhibit appropriate spatial and compositional properties, which are conducive to cell attachment, proliferation, differentiation and organization to form desired tissue. Provided herein are novel methods of making novel nano/macroporous scaffolds.

SUMMARY OF THE INVENTION

In one embodiment, a method is provided for fabricating a nano-macroporous glass, the method comprising the steps of: providing a glass having an average particle size of about 10 to about 500 μm; combining the glass with a water soluble pore former to form a mixture; pressing the mixture to form a green compact; exposing the green compact to an aqueous solution at a selected temperature and for a time sufficient to dissolve at least some of the water soluble pore former to form a macroporous green compact characterized by interconnected macropores having an average diameter of greater than about 100 μm; heating the macroporous green compact to decompose any remaining water soluble pore former and to form a crystallized macroporous glass; and leaching the crystallized macroporous glass to form a macro-nanoporous glass article characterized by the presence of interconnected macropores having an average diameter of greater than about 100 μm, interconnected nanopores, and a volume of porosity of between about 55% and about 70%.

In another embodiment, a nano-macroporous article is provided, the article formed by the method of the above embodiment.

In still another embodiment, a method is provided for fabricating a nano-macroporous glass, the method comprising the steps of: providing a soda lime phosphosilicate glass having an average particle size of about 30 to about 250 μm; combining the glass with a sugar comprising sucrose to form a mixture; pressing the mixture to form a green compact; exposing the green compact to an aqueous solution at a selected temperature and for a time sufficient to dissolve at least some of the sugar to form a macroporous green compact characterized by interconnected macropores having an average diameter of greater than about 100 μm; heating the macroporous green compact to melt any remaining sugar and to form a crystallized macroporous glass having at least two phases therein; and thereafter leaching the crystallized macroporous glass, without completely removing either of the at least two phases in the crystallized macroporous glass to thereby form a macro-nanoporous glass bioscaffold characterized by the presence of interconnected macropores having an average diameter of greater than about 100 μm and by the presence of interconnected nanopores having an average diameter of between about 100 to about 300 nm.

BRIEF DESCRIPTION OF THE DRAWINGS

The present invention will hereinafter be described in conjunction with the appended drawing figures wherein like numerals denote like elements.

FIG. 1(b) is a photograph of compact samples after dissolving the sucrose in $H_2O$ at 25° C. for 48 h.

FIG. 1(c) is a photograph of compact samples after dissolving the sucrose in $H_2O$ at 25° C. for 48 h followed by sintering at 650° C. for 1 h.

FIG. 2(b) is an SEM micrograph of a cold pressed macroporous sample with R=85/15 wt % and particle size range 38-57 μm) after dissolving the sugar in $H_2O$ at 25° C. for 48 h.

FIG. 4(b) is an SEM micrograph showing the surfaces of a macroporous sample after sintering at 650° C. for 1 h, wherein the samples were prepared with R=90/10 wt % and particle size range 75-125 μm.

FIG. 4(c) is an SEM micrograph showing the surfaces of a macroporous sample after sintering at 650° C. for 1 h, wherein the samples were prepared with R=60/40 wt % and particle size range 75-125 μm.

FIG. 4(d) is an SEM micrograph showing the surfaces of a macroporous sample after sintering at 650° C. for 1 h, wherein the samples were prepared with R=60/40 wt % and particle size range 125-212 μm.

FIG. 4(e) is an SEM micrograph showing the surfaces of a macroporous sample after sintering at 650° C. for 1 h, wherein the samples were prepared with R=50/50 wt % and particle size range 125-212 μm.

FIG. 5(b) is an SEM micrograph of the surface of a sample with R=90/10 wt % and particle size range 75-125 μm, the sample being a macroporous compact after sintering heat treatment at 650° C. for 1 h.

FIG. 5(c) is an SEM micrograph of the surface of a sample with R=90/10 wt % and particle size range 75-125 μm, the sample being a nano-macro porous compact after sintering at 650° C. for 1 h+chemical treatment with 1M HCl at 25° C. for 5 h.

FIG. 5(d) is an SEM micrograph of the surface of a sample with R=90/10 wt % and particle size range 75-125 μm, the sample being a nano-macro porous compact after sintering at 650° C. for 1 h+chemical treatment with 1M HCl at 25° C. for 1 h.

FIG. 5(e) is an SEM micrograph of the surface of a sample with R=90/10 wt % and particle size range 75-125 μm, the sample being a nano-macro porous compact after sintering at 650° C. for 1 h+chemical treatment with 0.3M HCl at 25° C. for 1 h.

FIG. 6(b) is a photographs of nano-macro porous samples with R=90/10 wt % and particle size range 75-125 μm after sintering at 650° C. for 1 h, followed by chemical leaching, such as, for example, in 1 M HCl at 25° C. for 5 h.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Several approaches have been proposed during the last decade for restoring bones damaged from injuries or diseases. It is well-known that there are many difficulties associated with the use of autografts, allografts, and xenografts due to donor site scarcity, rejection, disease transmission, multiple operations, high costs, etc. Therefore, recently researchers are focusing on the development of new possibilities that would overcome these drawbacks through tissue engineering. Synthesis or regeneration of tissues and organ with the help of porous scaffolds, which mimic the body's own extracellular matrix, is being pursued. The acceptable scaffolds should exhibit appropriate spatial and compositional properties, which are conducive to cell attachment, proliferation, differentiation and organization to form desired tissue. Morphologically, the scaffolds should have multimodal porosity, interconnected pores ranging in size from several nm to several hundreds of micrometers, and appropriate surface roughness. Pore characteristic is a key factor for cell attachment, proliferation and differentiation. In addition, the scaffolds must possess biocompatibility, rate of degradation and mechanical attributes compatible with bone growth and remodeling.

For the regeneration of hard tissue, ceramic and glass scaffolds are primarily being considered primarily. In this work, we have focused on the fabrication of glass scaffolds using classic 45S bioactive glass composition as a model system for the proof of concept. This glass undergoes surface reaction in vivo, resulting in a calcium phosphate interfacial layer that leads to bonding with both soft and hard tissue. Thus the biocompatibility of this particular composition is well established. To obtain desired (in vivo) degradation of scaffolds, which will match the rate of bone regeneration, introduction of additional interconnected nano-porosity has been suggested, leading to tailored amorphous multi porosity (TAMP) structures. The nanopores also appear to promote cell adhesion. Consequently, nano-macro porous biocompatible glass appears to be the most promising candidate for bone scaffolds.

The so-called 'Vycor' process is the standard method for introducing porosity in glasses prepared by the melt-quench method. The Vycor process leads to uniform porosity of one size at the submicron scale. However, through this type of process alone, it has not been possible to fabricate interconnected bi (or multi)-modal nano-macro porosity in glass by the melt-quench method. On the other hand, some have posed that nano-macro porosity could be introduced in glasses prepared by the sol-gel process—but in that case cracking, poor strength and limited size of the sample remain significant challenges. In short, the fabrication of nano-macro porous bioactive glass scaffolds has remained a difficult problem.

Toward the goal of nano-macro porous bioactive glass scaffolds, we herein describe based loosely on the classic melt-quench method, which combines phase separation and devitrification. Compared to the sol-gel approach, it has the advantage of easier formability into complex shapes by casting or fiber drawing for flexible structures and relatively lower cost. However, in the past, the size of the largest pores produced by melt-quench methods has been less than optimum for tissue ingrowth and nutrient delivery in vivo (e.g. less than the threshold desired average pore size of at least about 100 μm). Herein we report methods that improve upon the melt-quench route to fabricate large scale three-dimensional ("3D") multimodal interconnected porosity, such as by using water soluble pore-formers such as sugars, and in some examples, sucrose alone as a soluble pore former.

The methods reported here are simple and inexpensive for introducing multimodal porosity in glass of suitable composition. They offer excellent control of overall porosity, pore size, interconnectivity, and internal pore geometry, superior to any known method of bioscaffold fabrication. The structures prepared by this method are applicable in tissue engineering, but are equally suited for other applications involving filtration, drug delivery, etc.—where controlled nano-macro porosity is desired in a glass article or composition of glass.

As an overview, the inventors herein have developed methods for preparing glasses with a highly interconnected microstructure by using sugars, such as sucrose, as a macropore former.

In an embodiment, the methods involve creating green compact by: crushing and sieving glass to a particle size of about 38 to about 212 µm; combining the crushed glass with sugar, such as sucrose to form a mixture; pressing the mixture to form a green compact; exposing the green compact to an aqueous solution at a selected temperature and for a time sufficient to dissolve at least some of the sugar to form a macroporous green compact; heating the macroporous green compact to decompose any remaining sugar and to form a crystallized macroporous glass; and thereafter leaching the crystallized macroporous glass to form a nano-macroporous glass having a controlled and desirable volume of porosity. In this example, we noted that exposing the green compact to an aqueous solution, such as water at room temperature, introduces desired macro scale porosity of ≥200 µm. Further, the heating process also induces crystallization, which is then exploited for introducing large scale (e.g. widespread, substantially uniform porosity throughout the glass article) nano-scale porosity (average pore size of between about 100 to about 300 nm), suitable for virus separation and other in vivo and in vitro uses. Lastly, the step of leaching, such as in HCl under controlled conditions, yields desired nano-macro porous (e.g. with pore sizes ranging between about 10 nm to about 200 µm) glass that is suitable for use as bone scaffold, filters for virus removal, and other applications.

The fabrication of nano-macro porous scaffold in the present method generally includes three key steps. In the first step, interconnected macroporous structure is prepared. In an example, this step involves providing a bulk soda lime phosphosilicate glass of specified composition, which is then crushed and sieved into desired size powder. Next, a "green" composite compact consisting of glass and a sugar (such as sucrose) powder in a preselected ratio is formed by mixing, followed by pressing the mixture into a die, preferably at room temperature. Next, the formation of a 3D interconnected macro porous network is formed in the green compact by exposure to an aqueous solution, for example dissolving part of the sucrose in water at room temperature. The result is a macroporous green compact.

In the second key step, the macroporous green compact is heated to remove any remaining sugar, as well as to sinter the glass by exposure to a temperature of at least the glass transition temperature. In the sintering and resulting crystallization it causes in the glass, a series of interconnected macropores with controlled size (in some cases even larger than 100 microns) are formed. The sintering heat-treatment also induces nanoscale phase separation in the glass. That nanoscale phase separation is later exploited for introducing nanoscale porosity.

Finally, the third key step is a chemical treatment of the sintered macroporous compact, such as with an acid such as hydrochloric acid (or alternatively with a base depending upon the phases to be removed from the phases formed in phase separation of the previous steps) to yield desired nano-macro porosity. The amount of leaching is controllable by selectable factors such as acid (or base) concentration, temperature, time, volume, and shape of the compact, among other things.

In a preferred example, the method utilizes a phosphosilicate glass and sucrose, as detailed herein. In this example, the soda lime phosphosilicate bioactive glass of the so-called "45S" composition ($24.4Na_2O$-$26.9CaO$-$2.6P_2O_5$-$46.1SiO_2$ (in mol %)) was prepared by the melt quench method. However, other biocompatible glass and starting materials are suitable, including those glasses and materials described in the commonly owned U.S. patent application Ser. No. 12/526,599 and its PCT counterpart application US2008/053851, published as U.S. Patent Application Publication Number 2010-0015244 A1 on Jan. 21, 2010, and hereby incorporated by reference as though fully textually set forth herein. Glasses described therein include, for example, 4"x"S series glasses (e.g. those in the $CaO$—$Na_2O$—$P_2O_5$—$SiO_2$ series where "x" represents the weight percent of $SiO_2$), as well as glass within the $Na_2O$—$B_2O_3$—$SiO_2$ series. See, e.g., A. K. Varshneya, Fundamentals of Inorganic Glasses, p. 66. Academic Press, New York, 1994. By way of further example, the following Table A1 (from US 2008/053851) represents some particularly suitable glass starting materials for use in the present methods. To identify the glass samples described herein, we have followed the notation XXS proposed by Hench, where the first two letters represent the wt % of $SiO_2$, e.g., 42S means a glass that contains 42 wt % $SiO_2$. To indicate the transformation of a glass to glass-ceramic, we have modified the notation to XXSGY, where G signifies glass-ceramic and Y indicates a particular heat treatment.

TABLE A1

Temperature and time of heat treatment schedule of various glasses in the $24.5CaO$—$(27.5 - x)Na_2O$—$6P_2O_5$—$(42 + x)SiO_2$ (wt %) series (with x = 0-10). All samples were given the same nucleation heat treatment.

| $SiO_2$ (wt. %) | Sample I.D. | Crystal Growth Step ($T_x$ for time t) |
|---|---|---|
| 42 | 42SG1 | 750° C. for 6 h |
| 43 | 43SG1 | 750° C. for 6 h |
| 44 | 44SG1 | 750° C. for 6 h |
| 45 | 45SG1 | 750° C. for 6 h |
| 46 | 46SG1 | 750° C. for 6 h |
| 47 | 47SG1 | 750° C. for 6 h |
| 48 | 48SG1 | 750° C. for 6 h |
| 49 | 49SG1 | 750° C. for 6 h |
| 50 | 50SG1 | 750° C. for 6 h |
| 52 | 52SG1 | 750° C. for 6 h |
| 45 | 45SG2 | 1075° C. for 6 h |
| 48 | 48SG2 | 1075° C. for 6 h |
| 49 | 49SG2 | 1075° C. for 6 h |
| 45 | 45SG3 | 750° C. for 9 h |

The morphologies and mechanisms of phase separation varied in the above glass samples containing 42-52 wt % $SiO_2$. For $SiO_2$ in the 42-43 and 50-52 wt % ranges, the glass compositions produce fine structure consisting of disconnected precipitates, which we interpret as a consequence of the composition being in the binodal region. For $SiO_2$ in the 44-49 wt % range, the compositions produce interconnected spinodal texture. Such glasses are particularly useful in the present methods as glass starting materials for mixing with the water soluble pore former.

In this exemplary method, to form the glass starting material, the raw materials, including SiO.sub.2 (Alfa Aesar, 99.995% pure), sodium carbonate (Alfa Aesar, 99.95% (dried basis)), calcium carbonate (Alfa Aesar, 99.95%), and calcium phosphate tribasic (Alfa Aesar, 99.99% pure), were mixed in 40 g batch and melted in a platinum crucible at 1500.degree. C. for 2 h. The glass was formed by casting the melt in a stainless-steel mold, and then annealing for 3 h at 520.degree. C., followed by slow cooling to room temperature. The glass was crushed and ground into powder, which was then separated in three different parts according to particle size ranges (d1, d2, d3), using sieves of 38, 75, 125 and 212 am sizes. Thus, d1, d2 and d3 represented particles of size range (38-75 µm), (75-125 µm), and (125-212 µm), respectively. However, any particle size range is accomplishable by varying the crushing and grinding process, or by using other particle size reduction equipment and methods compatible with reducing the size of glass particles. Further, the inventors conceive that glass particle sizes of between 10 µm and 500 µm are compatible with the methods taught herein.

The sucrose powder (Alfa Aesar, 99% pure) was also ground and then separated according to size ranges d1, d2 and d3, as taught above. However, any water soluble pore former in any particle size range is accomplishable by varying the crushing and grinding process, or by using other particle size reduction equipment and methods that are compatible with reducing the size of sugar and starch particles. Further, the inventors conceive that water soluble pore former particle sizes of between 10 µm and 500 µm are compatible with the methods herein.

In the non-limiting examples disclosed herein, glass and sucrose powders of roughly the same particle size range (i.e. d1, d2 or d3) were mixed in varying ratio (R=glass/sucrose) by wt %, viz. 90/10, 80/20, 70/30, 60/40, 50/50. Green compact discs of glass and sucrose powder mixtures were formed by pressing at 10 MPa in a die at room temperature. Table 1 below describes the various combinations of R and d values used in preparing the compact samples. In the next fabrication step, 3D interconnected macro porous structure was formed by slowly dissolving the sucrose part in water at room temperature using 80 ml deionized $H_2O$/gram for 48 h. The macroporous compact samples, which were fragile but sufficiently strong for handling, were subjected to sintering heat treatment by heating at 3° C./min to 190° C. and holding for 1 h, followed by heating to 650° C. at the same rate and holding there for 1 h before cooling down to room temperature at a rate of about −3° C./min. Table 1 also lists various samples that were sintered in this manner.

To produce multimodal nano-macro porosity, the sintered samples were chemically treated in 1.0, 0.3 or 0.1 M HCl acid (using 50 ml acid/gram of compact green disc) at 25° C. or 85° C. for 60 min without stirring to partially leach out some of the phases. To identify the crystalline phases the samples were analyzed by X-ray diffraction (XRD) technique and their microstructure was observed with a scanning electron microscope (SEM, Hitachi 4300). The pore size distribution of the samples was determined by mercury porosimeter (Micromeritics Auto pore IV).

The inventive methods of fabrication of nano-macro porous glass materials herein generally include three key steps: (a) formation of interconnected macroporous structure, (b) sintering heat treatment, and (c) formation of interconnected nanoporous structure. Without being limited by theory, we now describe the underlying parameters of each step.

Formation of interconnected macroporous structure. We anticipate from the nature of our fabrication method that the key process parameters for forming the macroporous structure would be: the weight ratio of glass/sucrose, the range of particle size of glass and sucrose powders, the ratio of water volume to compact green disc weight, and time for the dissolution or melting of sucrose. We find that the weight ratio (R) and size range (d) of glass/sucrose particles, and the duration of dissolution or melting treatment most strongly affect the formation of macropores.

We have tried several approaches for introducing macroporosity in our compact samples: one with water and another without using water. In the first approach, sucrose part is dissolved in water at room temperature. In the second approach sucrose is removed from the pellet by melting it at 190° C. To compare the two approaches for introducing macroporosity, we prepared ten compact samples in two sets with R=85/15, 80/20, 70/30, 60/40, or 50/50 (wt %), and one particle size range (d=38-75 µm).

All compact samples in the first set tested for dissolution in water remained intact. In contrast, all compact samples in the second set tested for the removal of sucrose by melting did not hold together and broke apart. This fact is illustrated by the photographs in FIG. 1, obtained for two compact samples with R=85/15 wt % and d=38-75 µm particle size range, as one example of this comparison. In general, we found that the dissolution method works well for a wider range of R and d values of glass/sucrose particles than the melting method. Additionally, it was found that the macropore number density in all compact samples prepared by sucrose dissolution is greater and more uniform than that in all samples prepared by the sucrose melting method. As evidence of this conclusion, FIGS. 2(a) and 2(b) show one example for the macropore number density of the two kinds of samples with R=85/15 wt % and particle size range 38-75 µm.

For the sucrose melting method, the maximum useful value of glass/sucrose weight ratio was 90/10 when the size range of both types of particles was between 38-75 µm. Beyond this value of weight ratio and particle size range, the compact samples did not hold together and broke apart. By comparison, for the sucrose dissolution method, the maximum value of R and d was 50/50 wt % and 125-212 µm, respectively. Evidently, the dissolution of sucrose in water at room temperature allows the sucrose liquid to slowly egress from the whole compact matrix without introducing significant internal stress and/or microcracking. This approach reduces the probability of sample disintegration and produces uniform porosity. In the sucrose melting method, on the other hand, the viscous melt does not leave the compact matrix completely. Furthermore, it introduces internal stresses and microcracks, causing disintegration and non-uniform porosity. Overall, the presently tested process parameters (weight ratio and particle size of glass/sucrose powders, and temperature-time of dissolution or melting, and sintering process) play important role in introducing internal stresses, microcracking, fracture, and uniformity of porosity in the sample. The sucrose dissolution method is proven to be consistently better than the sucrose melting method for introducing interconnected macro-porosity.

Table 1 represents various green compact samples prepared with different weight ratios and particles size ranges of glass and sucrose powders and macroporous compact samples after sintering heat treatment at 650° C. for 1 h.

TABLE 1

| Sample ID | Glass/sucrose ratio (wt %) | Range of particle size (m) | Sample process state |
|---|---|---|---|
| 1 | 90/10 | 38-75 | Green compact |
| 2 | | 75-125 | |
| 3 | | 125-212 | |
| 4 | 80/20 | 38-75 | Green compact |
| 5 | | 75-125 | |
| 6 | | 125-212 | |
| 7 | 70/30 | 38-75 | Green compact |
| 8 | | 75-125 | |
| 9 | | 125-212 | |
| 10 | 60/40 | 38-75 | Green compact |
| 11 | | 75-125 | |
| 12 | | 125-212 | |
| 13 | 50/50 | 38-75 | Green compact |
| 14 | | 75-125 | |
| 15 | | 125-212 | |
| 16 | 90/10 | 38-75 | Macroporous sintered |
| 17 | | 75-125 | |
| 18 | | 125-212 | |
| 19 | 80/20 | 38-75 | Macroporous sintered |
| 20 | | 75-125 | |
| 21 | | 125-212 | |
| 22 | 70/30 | 38-75 | Macroporous sintered |
| 23 | | 75-125 | |
| 24 | | 125-212 | |
| 25 | 60/40 | 38-75 | Macroporous sintered |
| 26 | | 75-125 | |
| 27 | | 125-212 | |

Table 2 represents nano-macro porous compact samples formed by the sucrose dissolution method and subjected to heat (sintering)+chemical treatment. The ranges of particle size and sintering treatment are 75-125 μm, and 650° C. for 1 h, respectively.

TABLE 2

| Sample ID | Glass/sucrose ratio (wt %) | Leaching acid | Leaching time and temperature |
|---|---|---|---|
| 28 | 90/10 | 1M HCl | 5 h at 25° C. |
| 29 | 90/10 | 1M HCl | 1 h at 25° C. |
| 30 | 90/10 | 0.3M HCl | 1 h at 25° C. |
| 31 | 90/10 | 1M HCl | 1 h at 80° C. |
| 32 | 60/40 | 1M HCl | 5 h at 25° C. |

Figure 3:
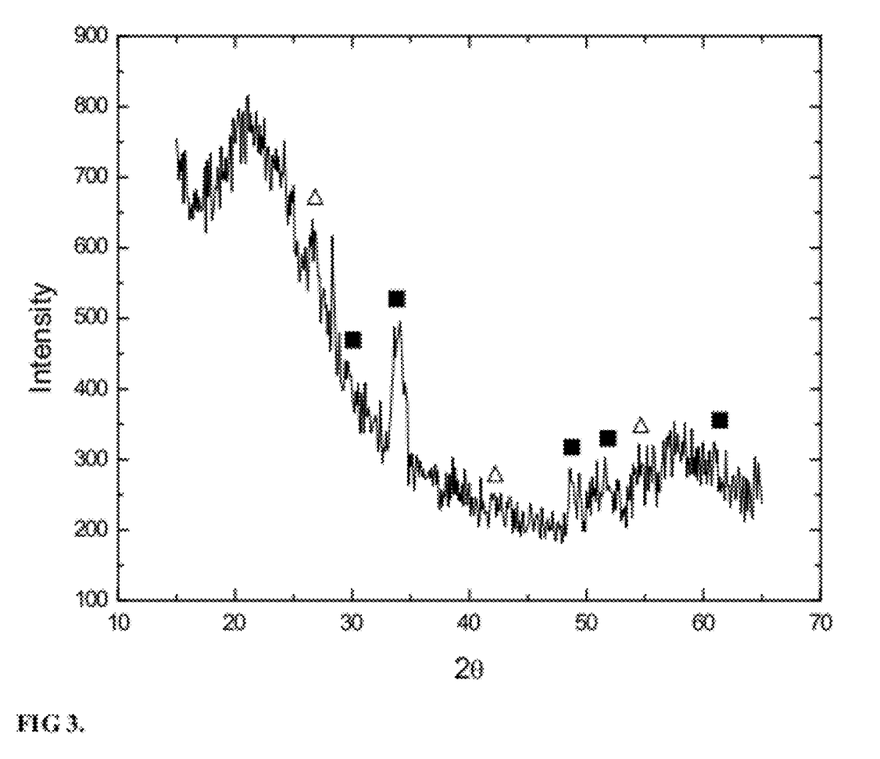
FIG. 3 is a graph illustrating the X-ray diffraction pattern of macroporous sample after sintering at 650° C. for 1 h. The compact was prepared with glass/sucrose ratio R=90/10 wt % and particle size range of powders 75-125 μm. (■ represents $Na_2Ca_2Si_3O_9$, and Δ represents $Na_2CaSi_3O_8$).

Heating/Sintering treatments. FIG. 3 shows the XRD pattern of macroporous compact sample (R=90/10 wt %, d=75-125 μm), which was sintered at 650° C. for 1 h. Here, two crystalline phases are identified, but there remain unidentified peaks due to some unknown phases. The location of identified diffraction peaks matches the standard powder diffraction file (PDF) card numbers 1-1078 and 15-177, respectively, indicating the presence of $Na_2Ca_2Si_3O_9$ and $Ca_4P_6O_{19}$ crystallites in the sample. FIG. 4 shows but one example of the microstructure of our macroporous glass series prepared by the sucrose dissolution method. In general, we observed a significant increase in the strength of samples when the sintering was done at 650° C. or a higher temperature. These samples were sufficiently strong for normal handling. However, the samples sintered at lower temperatures had poor handling strength and those sintered at higher temperatures tended to devitrfy unnecessarily.

Figure 4A:
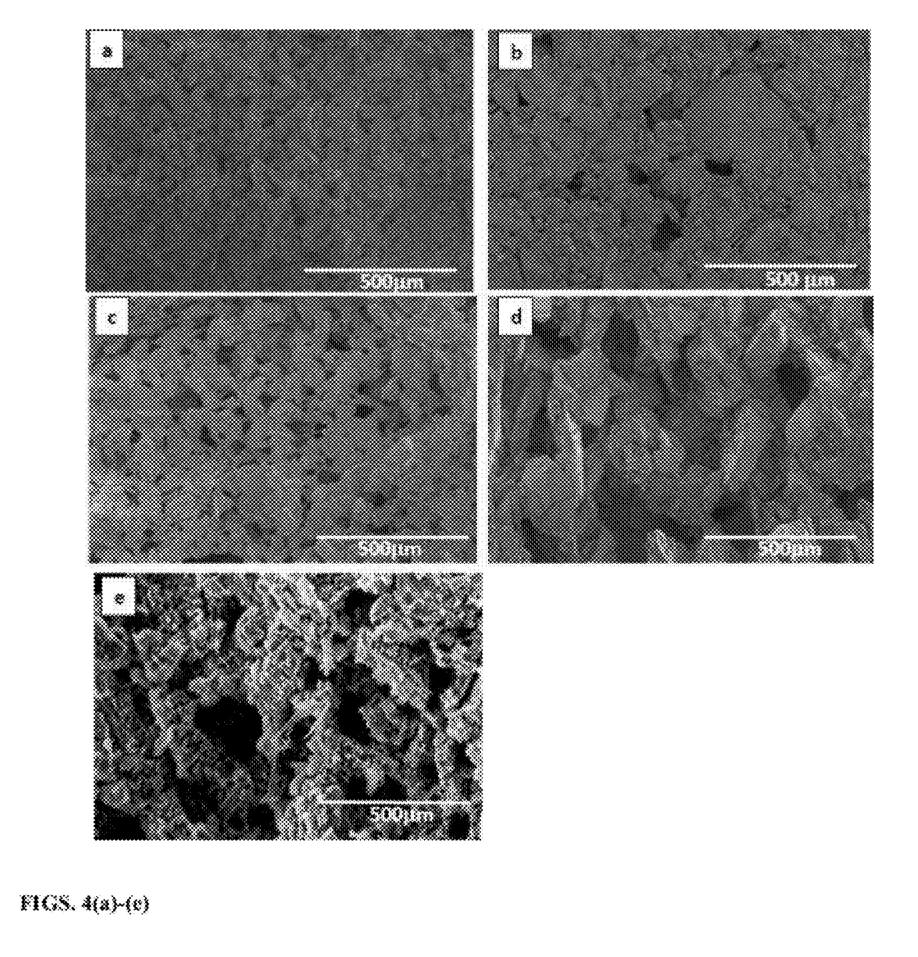
FIG. 4(a) is an SEM micrograph showing the surfaces of a macroporous sample after sintering at 650° C. for 1 h, wherein the samples were prepared with R=90/10 wt % and particle size range 38-75 μm).

FIGS. 4(a) and 4(b) compare the microstructure of macroporous samples formed by using the same ratio of glass/sucrose (R=90/10 wt %), but two different particle size ranges (38-75 μm) and (75-125 μm), respectively. On the other hand, FIGS. 4(c) and 4(d) compare the microstructure of compact samples formed with the same ratio of glass/sucrose (R=60/40 wt %), but two different particle size ranges (75-125 μm) and (125-212 μm), respectively. FIG. 4(e) shows macroporous structure of the compact sample formed with R=50/50 wt % and particle size range 125-212 μm. In general, it is clear that the pore size and macropore number density in the compacts increase with increasing particle size and glass/sucrose ratio as shown in FIGS. 4(a-e). Incidentally, although sample shown in FIG. 4(e) remained intact upon controlled dissolution of sucrose in water at 5° C. for 5 h, it disintegrated after sintering heat treatment at 650° C. for 1 h. This observation indicates the lower limit of R for making samples without breaking apart.

Figure 5A:
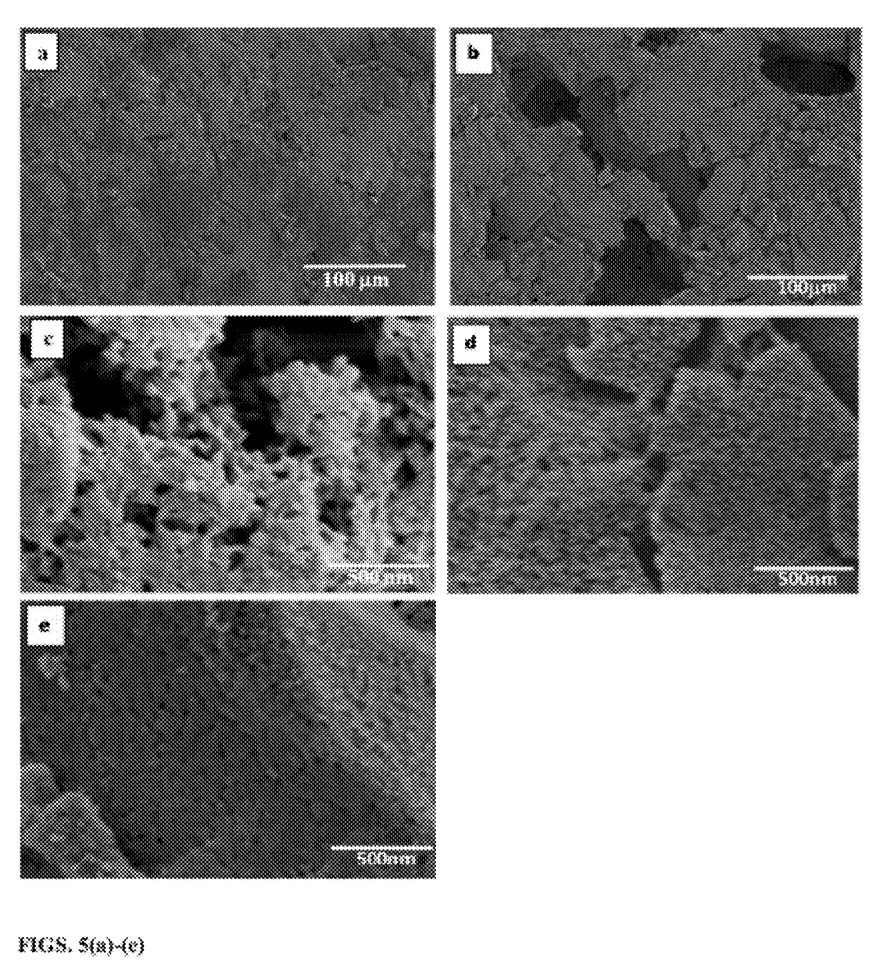
FIG. 5(a) is an SEM micrograph of the surface of a sample with R=90/10 wt % and particle size range 75-125 μm, the sample being a green compact sample without any treatment.

Formation of interconnected nanoporous structure: Table 2 lists the nano-macro porous compact samples formed by the sucrose dissolution method. They were subjected to heat plus chemical treatment for sintering the powder and then introducing nano-scale porosity. FIG. 5 shows one example for the evolution of microstructure of the sample with R=90/10 wt % and particle size range 75-125 μm. Starting with the green compact in FIG. 5(a) and as-sintered stage in FIG. 5(b), the remaining photographs show the effect of leaching of this sample in 1.0M or 0.3M HCl. Note the presence of nanoscale interconnected porosity in FIGS. 5(c-e) resulting from the leaching process. Furthermore, for the same glass/sucrose ratio, particle size, sintering heat treatment and leaching temperature, on average, the nanopore size and number density increase with longer leaching time and increasing strength of the leasching (HCl) solution.

FIG. 6 shows photographs of two compact samples that have the same process parameters for producing macroporous structure (glass/sucrose ratio 90/10 wt %, particle size range 75-125 m, and sintering at 650° C. for 1 h), but leached in 1M HCl either at 25° C. for 5 h, or at 80° C. for 1 h. Clearly, the sample remains intact after leaching at 25° C. for 5 h, but disintegrates after leaching at 80° C. for 1 h.

Figure 7:
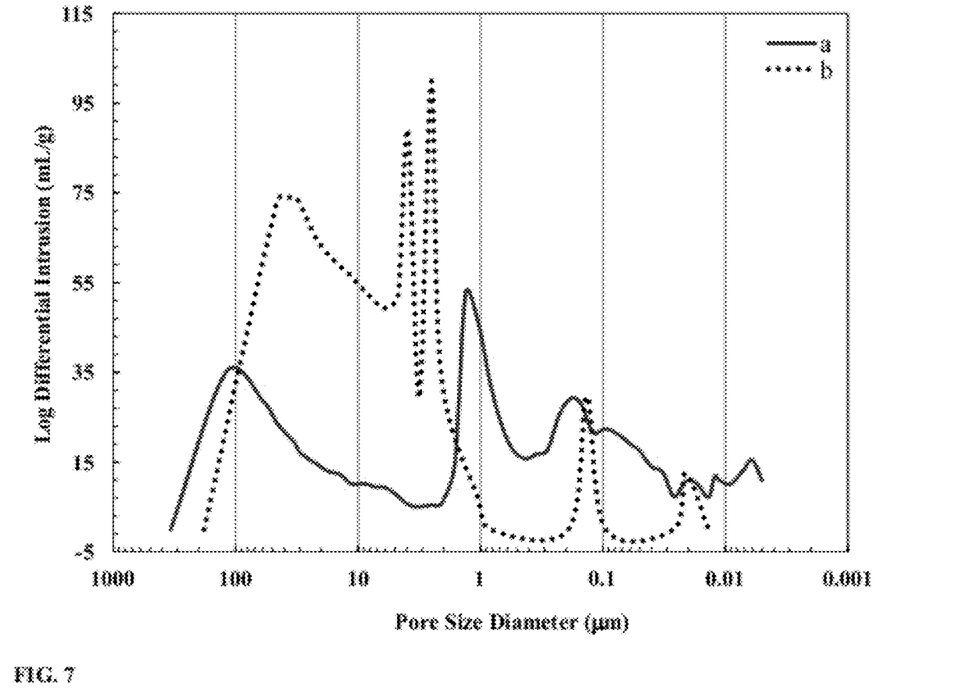
FIG. 7 is a graph that illustrates mercury porosimeter data comparing the distribution of pore size for the nano-macro porous samples prepared with and without sucrose pore former.

The development of the multimodal nano-macro interconnected porosity by the present technique is confirmed further by mercury porosity data in FIG. 7. Note that the size of the macropore is ≥100 μm with additional pores within the 0.1-10 μm range. At the other end of the pore size distribution, there are nanopores within the range of 10-100 nm. The initial dissolution process effectively removes sucrose particles, leaving behind a macro-porous structure that is determined by the choice of their average particle size viz. 75-125 μm for the sample shown in the figure. Then the leaching process removes parts of sodium calcium silicate and calcium phosphate crystalline phases, leaving behind multiscale porosity (from ≈10 nm to ≈10 μm). FIG. 7 shows a comparison of two samples prepared by the present method (R=90/10 wt %, d=75-125 μm) using sucrose as a macro-pore former vis-à-vis our previous technique which used just melt-quench-heat-chemical steps. We find that, compared to the previous method, the peak of macro pores in the sample prepared with sucrose has increased from about 45 μm to about 100 μm, and there is a larger fraction of sub-micron pores. However, larger or smaller pore sizes can be accomplished within the scope of the teachings herein, such as by providing smaller or larger particle sizes for the starting materials (water soluble pore former and/or glass particles).

Previous methods for fabricating nano-macro porous bioactive glass scaffolds by the melt-quench-heat-etch method produced less than optimum size of macro pores (about 45 μm). Our new methods overcomes this limitation and allows the fabrication of scaffolds with pores between about 10 nm to ≥100 μm. The new method makes use of the glass prepared by the previous melt-quench method, which is converted into powder. The powder is then mixed with sucrose powder and pressed, such as into pellets or other compacts. Macropores are then formed by controlled dissolution of sucrose in water. Nanopores are later formed when the sample is sintered and phase separated by controlled heat treatment, and then leached, such as in an acid like HCl.

The key process parameters for forming macroporous structure appear to be weight ratio of glass/sucrose, particle size of glass/sucrose powders, and time/temperature of sucrose dissolution. On the other hand, formation of nanopores appears to be controlled by the sintering heat treatment, and the parameters of leaching treatment that include time, temperature and HCl acid concentration.

Figure 1A:
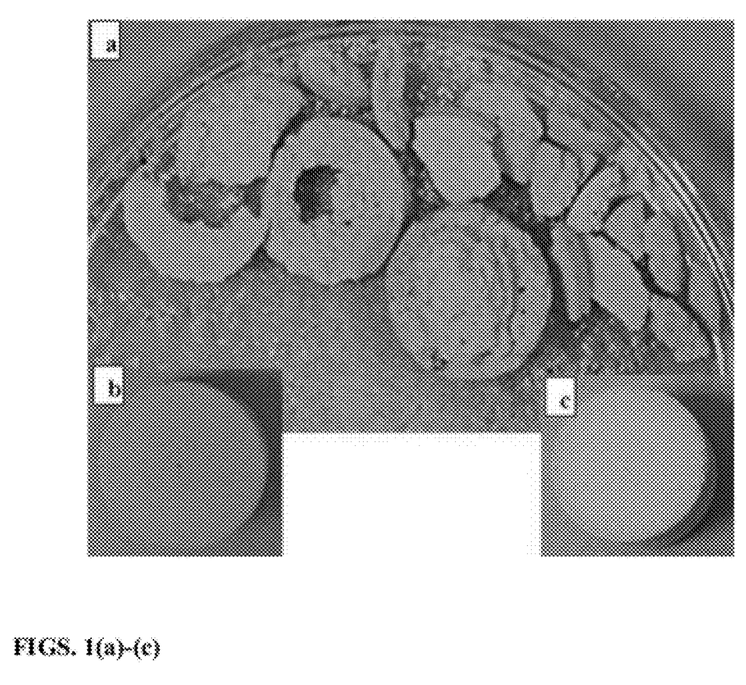
FIG. 1(a) is a photograph of macroporous compact samples in one embodiment where R=85/15 wt % and particle size range 38-57 μm, showing samples after melting of sucrose at 190° C. for 1 h followed by sintering at 650° C. for 1 h.
Figure 2A:
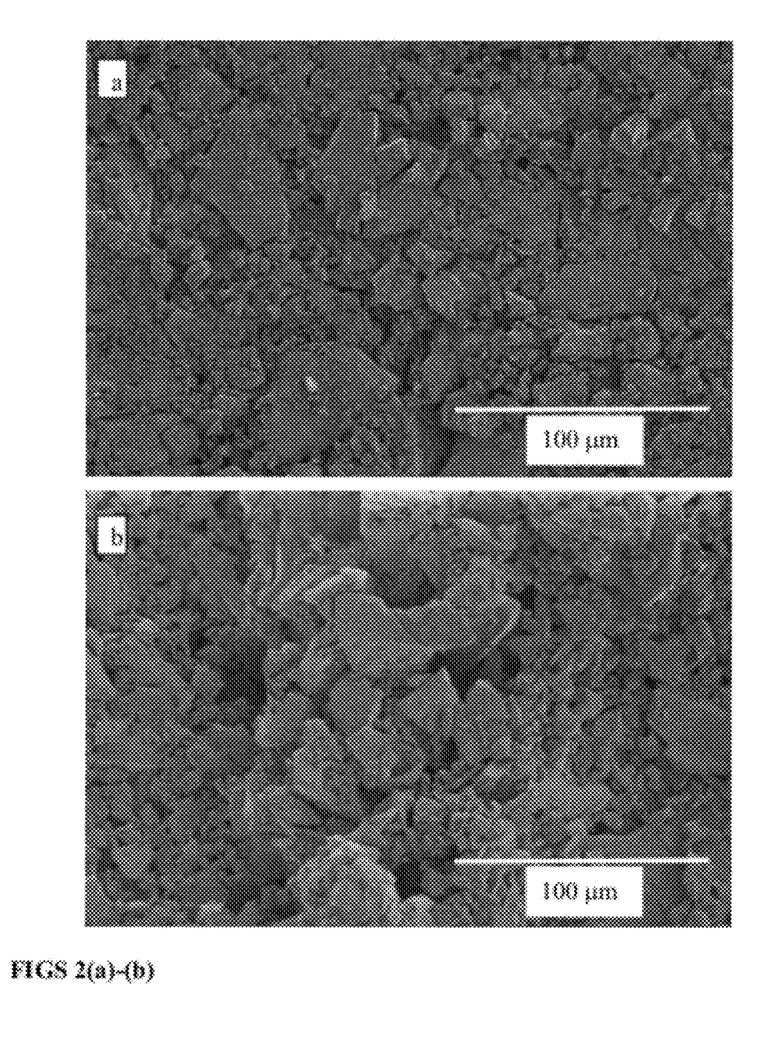
FIG. 2(a) is an SEM micrograph of a cold pressed macroporous sample with R=85/15 wt % and particle size range 38-57 μm) after melting of sugar at 190° C. for 1 h, followed by sintering at 650° C. for 1 h.

By way of further explanation, the Tables and Figures herein represent the following aspects of the invention:

FIGS. 1(a)-(c) shows photographs of macroporous compact samples (with R=85/15 wt % and particle size range 38-57 μm) after: a) Melting of sucrose at 190° C. for 1 h followed by sintering at 650° C. for 1 h; b) Dissolving the sucrose in $H_2O$ at 25° C. for 48 h; and c) Dissolving the sucrose in $H_2O$ at 25° C. for 48 h followed by sintering at 650° C. for 1 h.

FIGS. 2(a)-(b) shows SEM micrographs of cold pressed macroporous sample (with R=85/15 wt % and particle size range 38-57 μm) after (a) Melting of sugar at 190° C. for 1 h, followed by sintering at 650° C. for 1 h; (b) Dissolving the sugar in $H_2O$ at 25° C. for 48 h;

FIG. 3 shows X-ray diffraction pattern of macroporous sample after sintering at 650° C. for 1 h. The compact was prepared with glass/sucrose ratio R=90/10 wt % and particle size range of powders 75-125 μm. (wherein ■ represents $Na_2Ca_2Si_3O_9$, and Δ represents $Na_2CaSi_3O_8$ in the chart of FIG. 3).

FIGS. 4(a)-(e) shows SEM micrographs showing the surfaces of the macroporous samples after sintering at 650° C. for 1 h. The pressed samples were prepared with: a) R=90/10 wt % and particle size range 38-75 μm; b) R=90/10 wt % and particle size range 75-125 μm; c) R=60/40 wt % and particle size range 75-125 μm; d) R=60/40 wt % and particle size range 125-212 m; and e) R=50/50 wt % and particle size range 125-212 μm. This sample remains intact upon controlled dissolution of sucrose in water at 5° C. for 5 h, but disintegrates after sintering at 650° C. for 1 h.

FIG. 5 shows SEM micrographs of the surface of various samples (R=90/10 wt % and particle size range 75-125 μm): a) Green compact sample without any treatment; b) Macroporous compact sample after sintering heat treatment at 650° C. for 1 h; c) Nano-macro porous compact samples after sintering at 650° C. for 1 h+chemical treatment with 1M HCl at 25° C. for 5 h; d) Nano-macro porous compact samples after sintering at 650° C. for 1 h+chemical treatment with 1M HCl at 25° C. for 1 h; e) Nano-macro porous compact samples after sintering at 650° C. for 1 h+chemical treatment with 0.3M HCl at 25° C. for 1 h.

Figure 6A:
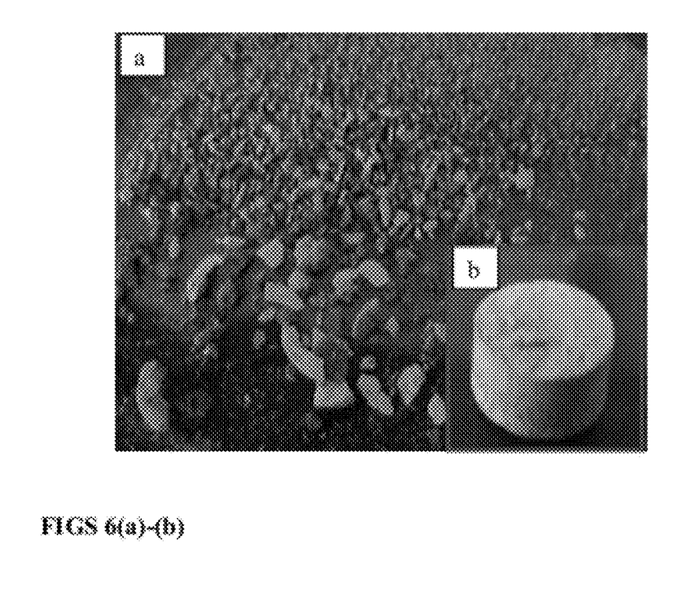
FIG. 6(a) is a photographs of nano-macro porous samples with R=90/10 wt % and particle size range 75-125 μm after sintering at 650° C. for 1 h, followed by chemical leaching treatment in 1M HCl, showing disintegration into small pieces after leaching at 80° C. for 1 h.

FIG. 6 shows photographs of nano-macro porous samples (R=90/10 wt % and particle size range 75 125 μm) after sintering at 650° C. for 1 h, followed by chemical leaching treatment in 1M HCl:

FIG. 6(a) shows the sample which disintegrated into small pieces after leaching at 80° C. for 1 h.

FIG. 6(b) shows the sample which remained intact after leaching at 25° C. for 5 h.

FIG. 7 shows mercury porosimeter data comparing the distribution of pore size for the nano-macro porous samples prepared with and without sucrose pore former. In the FIG. 7 chart, line "a" represents compact sample with R=90/10 wt %, particle size range 75-125 μm after sintering at 650° C. for 1 h followed by chemical treatment with 1M HCl at 25° C. for 5 h. Total porosity is 70%. Line "b" represents a glass-ceramic prepared by melt-quench-leach and without using any water soluble pore former, but following heat+chemical treatment. Total porosity is 30%.

While the principles of the invention have been described above in connection with preferred embodiments, it is to be clearly understood that this description is made only by way of example and not as a limitation of the scope of the invention.

The invention claimed is:

1. A method of fabricating a nano-macroporous glass, the method comprising the steps of:
   (a) combining a glass powder having an average particle size of about 10 to about 500 μm and interconnected spinodal phase separation with a water soluble pore former to form a mixture;
   (b) pressing the mixture to form a green compact;
   (c) exposing the green compact to an aqueous solution at a selected temperature and for a time sufficient to dissolve at least some of the water soluble pore former to form a macroporous green compact characterized by interconnected macropores having an average diameter of greater than about 100 μm;
   (d) heating the macroporous green compact to a temperature and for a time sufficient to decompose any remaining water soluble pore former, sinter said glass powder, and induce additional spinodal phase separation; and
   (e) leaching said interconnected spinodal phase separation to form interconnected nanopores, wherein leaching does not form macropores.

2. The method of claim 1, wherein the glass powder comprises at least one glass selected from the group consisting of soda lime phosphosilicate glass, soda-lime phosphofluorosilicate glass, and soda-lime potassia-phosphosilicate glass and wherein the water soluble pore former comprises at least one pore former selected from the group consisting of sugars and starches.

3. The method of claim 2, wherein the water soluble pore former comprises sucrose.

4. The method of claim 2, wherein the step of combining the glass powder with a water soluble pore former to form a mixture comprises providing a mixture consisting of from about 10 to about 90 percent glass by weight, and from about 10 to about 50 percent water soluble pore former by weight.

5. The method of claim 4, wherein the step of exposing the green compact to an aqueous solution at a selected temperature and for a time sufficient to dissolve at least some of the water soluble pore former to form a macroporous green compact is completed prior to step (d).

6. The method of claim 5, wherein the step of exposing the green compact to an aqueous solution at a selected temperature and for a time sufficient to dissolve at least some of the water soluble pore former to form a macroporous green compact comprises determining the time sufficient based upon the ratio of the mass of the green compact to the volume of the aqueous solution, and upon the selected temperature.

7. The method of claim 5, wherein the step of exposing the green compact to an aqueous solution at a selected temperature and for a time sufficient to dissolve at least some of the water soluble pore former to form a macroporous green compact comprises determining the time sufficient based upon the detected formation of macropores without compromising the integrity of the green compact.

8. The method of claim 5, wherein the ratio of the mass of the green compact to the volume of the aqueous solution is about 1 gm to about 80 ml.

9. The method of claim 5, wherein the selected temperature is less than about 200 degrees Celsius.

10. The method of claim 5, wherein the step of (d) produces at least two phases in the crystallized macroporous glass, and wherein the step of leaching does not completely remove any of the at least two phases in the crystallized macroporous glass.

11. The method of claim 5, wherein the crystallized glass consists essentially of at least one sodium-calcium silicate phase and at least one calcium phosphate phase.

12. The method of claim 1, wherein the step of leaching the crystallized glass to form a nano-macroporous glass comprises leaching in an acid solution for a time sufficient to yield large-scale nanoporosity.

13. The method of claim 12, wherein the step of combining the glass powder with at least one water soluble pore former to form a mixture comprises combining a glass comprising soda lime phosphosilicate with a sugar comprising sucrose, and wherein the mixture consists of glass and sugar in a ratio of between about 50 to about 90 percent glass by weight and about 50 to about 10 percent sugar by weight of the mixture.

14. The method of claim 1, wherein in step (e) the temperature is no greater than about 25° C.

15. The method of claim 14, wherein the temperature sufficient to melt any remaining sugar is at least about 180 degrees Celsius.

16. The method of claim 1, wherein, in step (d), the temperature is no greater than about 650 degrees Celsius.

17. A method of fabricating a nano-macroporous glass, the method comprising the steps of:
(a) combining a soda lime phosphosilicate glass powder having interconnected spinodal phase separation and having an average particle size of between about 30 to about 250 μm with a sugar comprising sucrose to form a mixture;
(b) pressing the mixture to form a green compact;
(c) exposing the green compact to an aqueous solution at a selected temperature and for a time sufficient to dissolve at least some of the sugar to form a macroporous green compact characterized by interconnected macropores having an average diameter of greater than about 100 μm;
(d) heating the macroporous green compact to a temperature and for a time sufficient to melt any remaining sugar, sinter said glass powder, and induce additional spinodal phase separation; and thereafter
(e) leaching the said spinodal phase separation to form interconnected nanopores having a diameter of between about 10 to about 100 nm, wherein leaching does not form macropores.

18. The method of claim 17, wherein the method produces a macro-nanoporous glass article further characterized by a volume of porosity of between about 55% and about 70%.

19. The method of claim 17, wherein the step of leaching is performed in an acid solution and without completely removing either of the at least two phases in the crystallized macroporous glass.

20. The method of claim 1, wherein said interconnected nanopores have a diameter of about 10 to about 100 nm.

21. The method of claim 1, wherein, in step (d), the temperature is no greater than about 650 degrees Celsius.

22. A method of fabricating a nano-macroporous glass, the method comprising the steps of:
(a) combining a glass having interconnected spinodal phase separation with a water soluble pore former to form a mixture;
(b) pressing the mixture to form a green compact;
(c) exposing the green compact to an aqueous solution at a selected temperature and for a time sufficient to dissolve at least some of the water soluble pore former to form a macroporous green compact characterized by interconnected macropores having an average diameter of greater than about 100 μm;
(d) heating the macroporous green compact to a temperature and for a time sufficient to sinter said glass powder, and induce additional spinodal phase separation, but not form crystallized glass phases, which, when leached away in step (e), leave interconnected nanopores but no macropores; and
(e) leaching the spinodal phase separation to form nanopores but not leaching crystallized glass phases to form macropores.

23. The method of claim 22, wherein said nanopores have a diameter of about 10 to about 100 nm.

* * * * *

UNITED STATES PATENT AND TRADEMARK OFFICE
CERTIFICATE OF CORRECTION

PATENT NO. : 9,656,900 B2
APPLICATION NO. : 13/358858
DATED : May 23, 2017
INVENTOR(S) : Himanshu Jain It is certified that error appears in the above-identified patent and that said Letters Patent is hereby corrected as shown below:

In the Specification

Column 1, Lines 18-24, change "This subject matter is related to work conducted at least in part with financial support from the United States National Science Foundation International Materials Institute for New Functionality in Glass (DMR-0844014) and Materials World Network (DMR-0602975) programs. The government of the United States may have certain rights herein." to "This invention was made with government support under DMR0409588, DMR0844014, and DMR0602975 awarded by the National Science Foundation. The government has certain rights in the invention."

Signed and Sealed this
Fifth Day of July, 2022

Katherine Kelly Vidal
*Director of the United States Patent and Trademark Office*